United States Patent [19]
Handwerk

[11] 3,891,744
[45] June 24, 1975

[54] PROCESS FOR PRODUCING CARBON MONOXIDE AND HYDROGEN
[75] Inventor: Glenn E. Handwerk, Golden, Colo.
[73] Assignee: Colorado School of Mines Research Institute, Golden, Colo.
[22] Filed: Sept. 12, 1973
[21] Appl. No.: 396,498

[52] U.S. Cl. .................. 423/415; 423/322; 423/648
[51] Int. Cl. .... C01b 31/00; C01b 15/16; C01b 1/00
[58] Field of Search .......................... 423/322–323, 423/415, 648, 304

[56] References Cited
UNITED STATES PATENTS
1,807,790   6/1931   Liljenroth .......................... 423/323
FOREIGN PATENTS OR APPLICATIONS
378,226   8/1932   United Kingdom ................. 423/323

Primary Examiner—O. R. Vertiz
Assistant Examiner—Gregory A. Heller
Attorney, Agent, or Firm—Sheridan, Ross & Fields

[57] ABSTRACT

Process for the continuous production of carbon monoxide and hydrogen as separate products utilizing as raw materials water and carbon, such as coal, char, coke and other carbonaceous materials. Hydrogen is produced by oxidation of phosphorus with steam in the first step of the process. The resulting phosphorus oxides are reduced with carbon in the second step of the process to produce carbon monoxide and elemental phosphorus which latter is recycled to the first step. Essentially no phosphorus is consumed.

33 Claims, 1 Drawing Figure

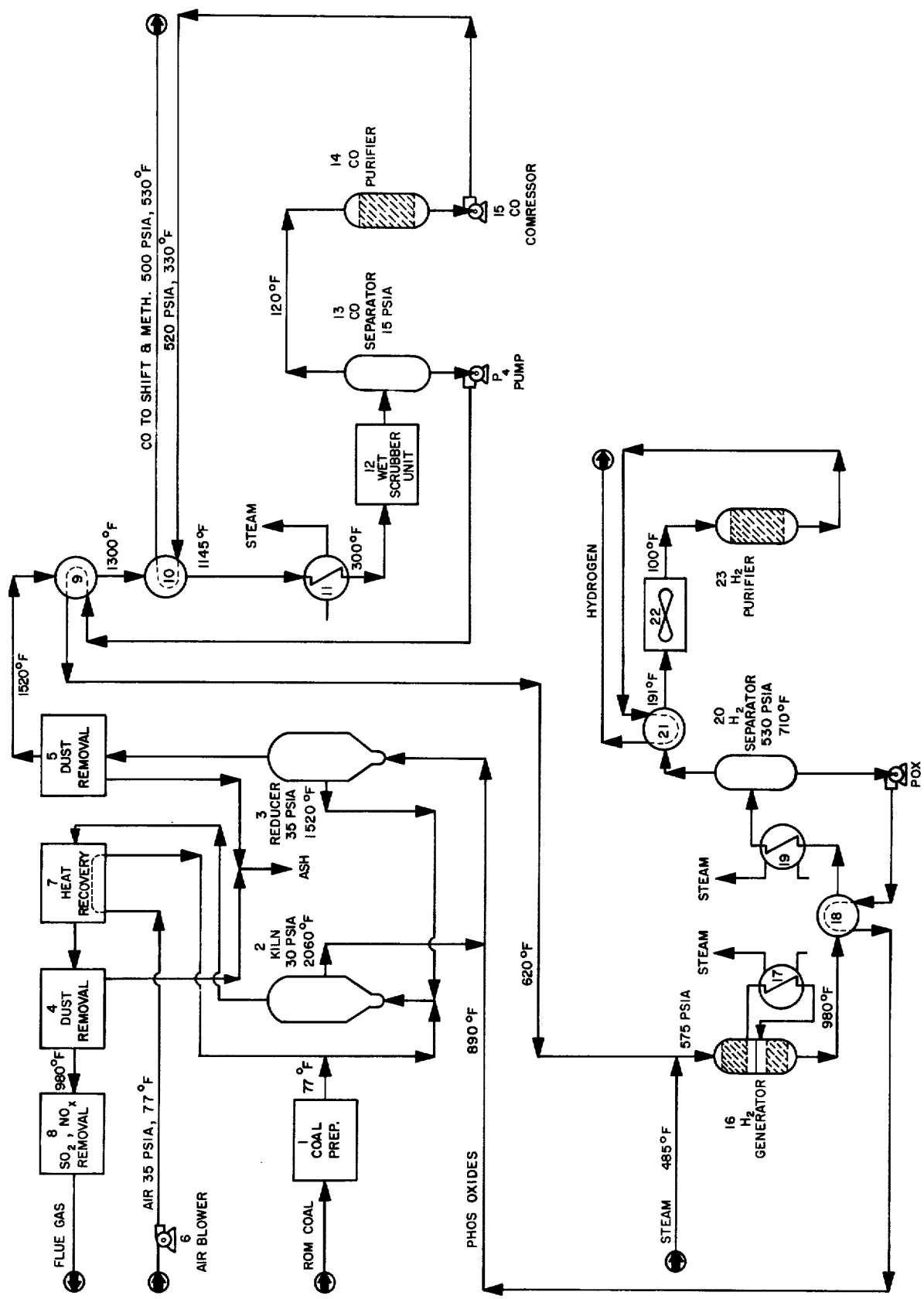

PROCESS FOR PRODUCING CARBON MONOXIDE AND HYDROGEN

BACKGROUND OF THE INVENTION

The present invention relates to a continuous process for production of hydrogen and carbon monoxide in which the only raw materials consumed are water and carbon. The purity of the hydrogen and carbon monoxide produced exceeds 99 and 80 percent, respectively, on a weight basis. Thermodynamic considerations and experimental data indicate that the process is attractive for conversion of water and coal or other carbonaceous materials into carbon monoxide and hydrogen.

Hydrogen is produced by oxidation of phosphorus with steam. The phosphorus for this reaction is regenerated by reducing the resulting phosphorus oxides with carbon to produce the carbon monoxide and elemental phosphorus which latter is recycled to the oxidation step. Essentially no phosphorus is consumed.

"Phosphorus oxides" as used herein includes at least one or more of the trivalent and pentavalent oxides of phosphorus, either hydrated or dehydrated.

As used herein, the term "carbon" means carbon derived from any source including carbonaceous materials and in any form usable for reducing the phosphorus oxides.

One of the important features of the present invention is that it presents an attractive process for production of hydrogen from a thermodynamic standpoint. While the cost for producing hydrogen for use in some of its applications may not be critical, its production cost when used as a fuel in competition with fossil fuel is critical. The utility of the present process and its attractiveness is illustrated herein when the hydrogen produced by the process is converted to the combustible gas methane; however, wide consideration is being given to the use of hydrogen alone as a fuel in competition with fossil fuel. The energy crisis and the rapidly diminishing sources of fossil fuel are now being given wide spread attention by both Government and private organizations. Hydrogen as a source of energy in applications for the generation of electricity, heat, and in other applications is being considered. The need for heat energy being universal, the potential use of hydrogen as a source of heat energy as well as electrical energy may be attractive. Present nuclear processes for producing energy for commercial purposes are mainly limited to applications for the generation of electricity only.

In the past, hydrogen has been produced by electrolysis of water, by high temperature steam reforming of methane, and by the steam-iron process wherein iron or ferrous oxide was reacted with steam with the formation of hydrogen and higher oxides of iron. Electrolysis of water for the production of hydrogen has generally been limited to small quantities due to the associated high costs of electricity. Reforming of methane with steam has the inherent disadvantages of utilizing as a raw material high cost and rapidly diminishing supplies of methane.

In the steam-iron process the iron oxides formed are reduced by carbon monoxide formed in a gas producer. In the general application of the steam-iron process the operation is conducted in a cyclic manner wherein the iron is oxidized with steam forming hydrogen and iron oxides. The iron oxides are then recycled to the reduction step. The steam-iron process has several recognized disadvantages. One of the primary disadvantages relates to the agglomerating properties of the iron and iron oxides at higher temperatures with resulting formation of agglomerates having less area for the oxidation and reduction reactions to take place. In certain versions of the steam-iron process, the iron and iron oxides are transported from an oxidizer to a reducer. The aforementioned agglomerates obviously create difficulty with such an operation.

It is the principal object of this invention to provide an economically feasible continuous process for simultaneous production of carbon monoxide and substantially pure hydrogen requiring the consumption of water and carbon only as raw materials.

Another object of this invention is to provide a continous process for the reduction of phosphorus oxides in a fluidized solids system wherein the fluidized solids comprise a carbon reducing agent and, optionally, an additional solid to serve as a heat carrier.

Other and additional objects of this invention will become apparanet from a consideration of this entire specification, including the claims thereof.

In its broadest aspect, this invention embodies a process for the simultaneous production of separate streams of hydrogen and carbon monoxide which comprises charging steam and elemental phosphorus to an oxidation reaction zone, reacting said steam and elemental phosphorus to form hydrogen and phosphorus oxides, continuously withdrawing hydrogen and phosphorus oxides from the reaction zone, separating the oxides from the hydrogen stream, passing said phosphorus oxides into a reducing vessel where they are contacted at elevated temperatures with carbonaceous reducing agents thereby forming carbon monoxide and elemental phosphorus, continuously removing the elemental phosphorus from the carbon monoxide and recycling the recovered phosphorus to the oxidation zone. The steps of the basic process are illustrated by the following balanced chemical equations:

Step 1: $P_4 + 10 H_2O \rightarrow P_4O_{10} + 10 H_2$

Step 2: $P_4O_{10} + 10C \rightarrow P_4 + 10 CO$

The invention in its broadest scope includes the combination of the two steps to provide a continuous process by recycling the phosphorus from Step 2 to Step 1. Various modifications of the invention are possible.

In Step 1, an excess of steam above stoichiometric is preferred, but not necessary. When excess steam is used, the total steam is preferably in the range of about one to one and one-half times the stoichiometric requirement. A preferred steam to phosphorus weight ratio is from about 1.5 to about 2.4. The reaction of Step 1 is exothermic and the temperature at any point in the reaction should be maintained below about 1400°F. This temperature can be controlled by introducing a part of the reactants, one or both, into different sections of the reaction zone, or by cooling and recycling reaction products to the inlet of the reaction zone, or by providing several reaction zones in series with intercoolers between zones, or by providing a chamber surrounding the reaction zone and containing a heat absorbing medium such as water, or by any combination of these methods.

Step 1 can readily be made to proceed adiabatically. A preferred minimum temperature for step 1 is about 500°F.

Pressure in the hydrogen generator is maintained above about two atmospheres of pressure. Preferably, the catalyst in the hydrogen generator is in a fixed bed. Alternatively, a fluidized catalyst system may be employed. Reactant space velocities in the catalytic reaction as described in the published literature are used. The oxidation reaction may also be carried out without a catalyst.

In order to enhance the thermodynamic advantages of the process, the exothermic heat produced in step 1 is utilized to preheat water and produce steam.

Step 1 has been thoroughly investigated for making phosphoric acid and by-product hydrogen. Some of the investigations are reported in the following three articles:

"Oxidation of Phosphorus by Steam", Brunauer and Shultz, Industrial and Engineering Chemistry, Volume 33, No. 6.

"Oxidation of Phosphorus with Steam", Shultz et al, Industrial and Engineering Chemistry, Volume 42, Pages 1608–16, August 1950.

"Oxidation of Phosphorus with Steam", Hein et al, Industrial and Engineering Chemistry, Volume 42, No. 8 August 1950, Pages 1616–22.

So far as is known, Step 2, the reduction of phosphorus oxides with carbon in accordance with the reaction of Step 2 is not disclosed in the literature. A two-volume text entitled "Phosphorus and Its Compounds" by J. R. Van Wazen (Interscience Publishers, Inc., 1958) describes the past and present methods for production of elemental phosphorus. These include distillation of urine concentrate in the presence of charcoal, distillation of concentrated phosphoric acid mixed with carbon in clay retorts, and reduction of calcium phosphate ores in the presence of carbon and sand in blast furnaces and electric furnaces.

Step 2 is performed with an excess of carbon to complete the reduction of the phosphorus oxides. The temperature of the reaction must be above about 1500°F. The temperature should not exceed the softening point of the ash contained in the carbon. The preferred temperature range is between about 1500°F and the softening temperature of the ash in the carbon. This softening temperature would ordinarily not be below about 2100°F. At temperatures below 1500°F, the reaction will not proceed satisfactorily, and at temperatures above the ash softening temperature prohibitive plugging of the equipment results.

The preferred pressure range for Step 2 in the reducer varies from about 1.5 to about 20.0 atmospheres, although this is not critical. The size of the carbon particles used in the reducer is not critical but, preferably, varies from about ¼ inch to about 200 mesh.

Carbon is preferably fed at a rate to provide a weight ratio of carbon to phosphorus above about 1 to 1. The reduction is endothermic and heat must be supplied to the reaction. This is done by heating the carbonaceous material before its introduction into the reducer. A modification with the use of a solid heat carrier, such as sand or bauxite is feasible. The carbon or carbonaceous material may be in the form of a fluidized bed.

The carbon in Reaction No. 2 is preferably produced from coal and may be in the form of char, coke, or coal itself may be used. Other carbonaceous materials such as organic compounds, petroleum and other fossil fuels containing carbon may be used.

After condensing the bulk of the phosphorous oxides and separating them from the hydrogen produced in Step 1, undesirable trace amounts of unreacted phosphorus and uncondensed phosphorus oxides may remain in the hydrogen gas. Similarly, after condensing the bulk of the elemental phosphorus in Step 2 to separate it from the carbon monoxide, undesirable trace amounts of phosphorus and phosphorus oxides may remain in the carbon monoxide.

Phosphorus oxides remaining in either the hydrogen or carbon monoxide streams may be removed by scrubbing with water or an aqueous alkaline solution. Phosphorus remaining in either the hydrogen or carbon monoxide streams may be removed by absorption in organic solvents such as benzene, toluene, xylene and diethyl ether. However, the bulk of the elemental phosphorus is removed from the carbon monoxide by cooling and condensation of the phosphorus.

The following example illustrates the operativeness of Step 2 and the feasibility of the continuous process resulting from the combination of Steps 1 and 2.

EXAMPLE 1

Approximately 32 grams of reagent grade phosphoric oxide powder was vaporized at about 800°F and atmospheric pressure. The phosphoric oxide vapors were passed through a refractory tube containing 310 grams of activated carbon. The particle size of the activated carbon was between 8 and 30 mesh. The size of the tube was approximately 1.75 inches inside diameter by 24 inches long. The tube was externally heated by electrical means to maintain the carbon temperature between 1900°F and 1950°F. Effluent vapors from the tube were cooled to about 120°F by bubbling through kerosene. Elemental phosphorus collected in the bottom of the kerosene container. Residual vapors were analyzed and found to contain carbon monoxide and carbon dioxide in a gaseous volume ratio of about 7 to 1, respectively. The reaction consumed about 12 grams of carbon and approximately 13 grams of phosphorus was produced.

A specific embodiment of the process will now be described by reference to the flow diagram of FIG. 1. In this specific embodiment run-of-mine coal is fed to a coal preparation facility where the coal is crushed and ground to −10 mesh. Coal is pneumatically conveyed by means of preheated combustion air to a fluid bed kiln 2 operated in the range of 2000° to 2300°F wherein moisture is vaporized, volatile matter and a portion of the fixed carbon are combusted and a hot residue of char is continuously withdrawn and pneumatically conveyed to the reducer 3.

Phosphorus oxides and acids in the vapor state from the hydrogen generator are introduced near the bottom of the reducer and serve to fluidize the char. The phosphorus oxides and acids react with carbon in the fluidized bed in the reducer to form elemental phosphorus and carbon monoxide. The carbon monoxide and phosphorus vapors leaving the reducer contain approximately 5 percent on a gaseous volume basis of carbon dioxide and minor traces of unreduced phosphorus oxides. Excess solid char from the reducer is returned to the kiln for reheating. Sufficient char is recirculated between the kiln and the reducer to supply the endothermic heat required for the reduction reaction. Alternatively, an inert solid such as sand or a solid catalyst could be used to carry heat from the kiln to the reducer instead of excess char. Transfer of the char between the reducer and the kiln is carried out in a conventional fluidized system method similar to fluid catalytic units employed by the petroleum refining industry.

Vapors leaving the reducer and gaseous combustion products leaving the kiln contain essentially all of the ash resulting from combustion of the char and coal and this ash is removed from the two respective streams in dust removal units 4 and 5 which may consist of cyclones and electrostatic precipitators or other means which will be apparent to those skilled in the art. Recovered ash from the dust removal units is deposed of by any suitable means. Combustion air from air blower 6 is preheated by heat exchange with hot combustion gases in heat recovery unit 7.

Oxides of sulfur and nitrogen resulting from combustion of the coal in the kiln are removed in cleanup unit 8 before being exhausted to the atmosphere. The effluent vapors from the reducer are cooled by heat exchange with product carbon monoxide and by waste heat steam generation in heat exchangers 9, 10 and 11. Remaining traces of dust are removed from the cooled effluent vapors in a conventional wet scrubbing unit 12 of any suitable type as will be apparent to those skilled in the art. Condensed phosphorus liquid is separated from the carbon monoxide gas in separator vessel 13. The carbon monoxide gas then passes through a purifier 14 which may contain crushed phosphate rock or pelletized calcium oxide for removal of trace phosphorus and phosphorus oxides. The carbon monoxide may then be used without further processing or as illustrated in FIG. 1, it may be compressed with carbon monoxide compressor 15 to elevated pressures for subsequent use in synthesis of methanol, methane, or other hydrocarbons as will be apparent to those skilled in the art. Alternatively, the carbon monoxide may be processed with steam in conventional shift-conversion operation for production of additional quantities of hydrogen.

Elemental liquid phosphorus separated in vessel 13 from the carbon monoxide is pumped through heat exchanger 9 where it is revaporized and then passes to hydrogen generator 16. Steam and elemental phosphorus are partially reacted in the upper bed of catalyst in the hydrogen generator. After partial conversion the reaction mixture is cooled by generation of waste heat steam in exchanger 17 to remove a portion of the exothermic reaction heat and the reaction mixture is then reintroduced into the hydrogen generator and passes through the second bed of catalyst to complete the conversion reaction.

Although only two beds of catalyst in series are shown in FIG. 1, it will be apparent that any reasonable number of beds may be used to control the reaction temperatures.

Hot effluent products from the generator consist primarily of phosphorus oxides and hydrogen. This mixture is partially cooled in heat exchanger 18 and further cooled in heat exchanger 19 to a final temperature of approximately 700° to 750°F at which point the condensed phosphorus oxides and acids are removed from the hydrogen gas in separator 20. The condensed phosphorus oxides and acids are reheated in exchanger 18 and returned as a vapor to the reducer. Hydrogen from the separator is cooled in heat exchanger 21 and air cooler 22 and then passes through the hydrogen purifier 23. The hydrogen purifier contains a fixed bed of char which adsorbs trace quantities of hydrogen phosphide and phosphine from the hydrogen stream.

The preferred size of the carbonaceous material used to absorb phosphides and phosphines varies from about 30 mesh to about 1.5 inch in diameter. Both hydrogen and methane can also be purified of phosphides and phosphines by passing these products through particulate phosphate rock. The hydrogen so produced is of high purity and can be used directly for synthesis of methane, methanol, or other hydrocarbons as will be apparent to those skilled in the art. The temperatures and pressures indicated on FIG. 1 represent a typical operation and are in no way restrictive of the invention.

From the above description of the invention it is seen that a continuous process has been provided for the economic production of hydrogen and carbon monoxide in which the only raw materials consumed are water and carbon.

What is claimed is:

1. A continuous process for the production of carbon monoxide and hydrogen which comprises the following steps:

a. oxidizing elemental phosphorus by contacting it with steam at a temperature between about 500°F – 1400°F to produce hydrogen, and phosphorus oxides;

b. separating the gaseous hydrogen and phosphorus oxides and recovering them;

c. reducing the phosphorus oxides with carbon or carbonaceous material at a temperature between about 1500°F and the softening point of the ash contained in the carbon or carbonaceous material to form carbon monoxide and elemental phosphorus;

d. separating the carbon monoxide and phosphorus formed in step (c) and recovering them; and e. recycling the phosphorus recovered in step (d) to step (a) for reuse in the continuous process.

2. The process of claim 1 in which gaseous hydrogen and phosphorus oxides are separated in step (b) by condensing the phosphorus oxides.

3. The process of claim 1 in which the carbon monoxide and gaseous phosphorus are separated in step (d) by condensing the phosphorus and the phosphorus is revaporized prior to step (e).

4. The process of claim 1 in which phosphorus only is recovered in step (d).

5. The process of claim 1 in which step (a) is performed at a pressure above about 2 atmospheres.

6. The process of claim 5 in which effluent gases from step (a) are cooled and recycled to control the temperature at which step (a) is performed.

7. The process of claim 1 in which an oxidation catalyst for the reaction of step (a) is used in two or more separated stationary beds and the oxidation mixture is sequentially passed from bed to bed.

8. The process of claim 7 in which the oxidation mixture is cooled as it passes between beds.

9. The process of claim 5 in which at least one fluidized bed of catalyst is employed for step (a).

10. The process of claim 1 in which the steam to phosphorus weight ratio in step (a) varies from about 1.5 to about 2.4.

11. The process of claim 1 in which step (a) is performed while removing exothermic heat of reaction from the reaction zone by heat exchange to maintain the reaction essentially isothermal.

12. The process of claim 1 in which the reduction reaction of step (c) is performed at a pressure above about 1.5 atmospheres.

13. The process of claim 1 in which the carbon is fed to the reduction reaction of step (c) at a rate to provide a weight ratio of carbon to phosphorus above about 1 to 1.

14. The process of claim 1 in which any phosphides and phosphines which may be formed in the reaction products of steps (a) and (c) are removed.

15. The process of claim 14 in which the phosphides and phosphines are removed by adsorption on a solid carbonaceous material.

16. The process of claim 15 in which the size of said carbonaceous material used to adsorb phosphides and phosphines varies from about 30 mesh to about 1½ inch.

17. The process of claim 14 in which phosphides and phosphines are removed by passing said products through particulate phosphate rock.

18. The process of claim 1 in which the reduction reaction of step (c) is accomplished in a fluidized bed of solid carbonaceous material.

19. The process of claim 1 in which a solid heat carrier is added to the reducing reaction of step (c).

20. The process of claim 19 in which said heat carrier is a solid carbonaceous material.

21. The process of claim 19 in which said heat carrier is also a catalyst for the reducing reaction.

22. The process of claim 19 in which said heat carrier is a material inert to the reducing reaction.

23. The process of claim 1 in which the carbon used in step (c) is char and it is formed by partial combustion of coal and introduced by a fluidized system from the coal combustion zone to the reaction of step (c).

24. The process of claim 19 in which said heat carrier is heated by the partial combustion of coal to form carbon for the reducing reaction of step (c).

25. The process of claim 1 in which the oxidation reaction of step (a) is conducted adiabatically.

26. The process of claim 2 in which trace amounts of phosphorus oxides which may remain in the hydrogen after step (b) are removed by scrubbing the hydrogen with water.

27. The process of claim 2 in which trace amounts of phosphorus oxides which may remain in the hydrogen after step (b) are removed by scrubbing the hydrogen with an aqueous alkaline solution.

28. The process of claim 2 in which trace amounts of unconverted elemental phosphorus which may remain in the hydrogen after step (b) are removed by scrubbing the hydrogen with an organic solvent.

29. The process of claim 28 in which the organic solvent is one selected from the group consisting of benzene, toluene, xylene and diethyl ether, and mixtures thereof.

30. The process of claim 3 in which trace amounts of phosphorus oxides which may remain in the carbon monoxide after step (d) are removed by scrubbing the carbon monoxide with water.

31. The process of claim 3 in which trace amounts of phosphorus oxides which may remain in the carbon monoxide after step (d) are removed by scrubbing the carbon monoxide with an aqueous alkaline solution.

32. The process of claim 3 in which trace amounts of elemental phosphorus which may remain in the carbon monoxide after step (d) are removed by scrubbing the carbon monoxide with an organic solvent.

33. The process of claim 32 in which the organic solvent is one selected from the group consisting of benzene, toluene, xylene and diethyl ether and mixtures thereof.

* * * * *